(12) United States Patent
Raj et al.

(10) Patent No.: US 12,555,114 B2
(45) Date of Patent: Feb. 17, 2026

(54) FRAUD DETECTION USING MULTI-TASK LEARNING AND/OR DEEP LEARNING

(71) Applicant: International Business Machines Corporation, Armonk, NY (US)

(72) Inventors: Jeetu Raj, Urbanna, IL (US); Erik Richter Altman, Danbury, CT (US); Shyam Ramji, Lagrange, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 16/923,295

(22) Filed: Jul. 8, 2020

(65) Prior Publication Data

US 2022/0012741 A1 Jan. 13, 2022

(51) Int. Cl.
| | |
|---|---|
| *G06Q 20/40* | (2012.01) |
| *G06N 3/045* | (2023.01) |
| *G06N 3/08* | (2023.01) |
| *G06N 5/04* | (2023.01) |
| *G06N 20/00* | (2019.01) |

(52) U.S. Cl.
CPC ......... *G06Q 20/4016* (2013.01); *G06N 3/045* (2023.01); *G06N 3/08* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,819,226 | A | 10/1998 | Gopinathan |
| 8,606,712 | B2 | 12/2013 | Choudhuri |
| 10,223,707 | B2 | 3/2019 | Granville, III |
| 10,360,591 | B2 | 7/2019 | Carlson |
| 10,546,332 | B2 | 1/2020 | Carlson |
| 2015/0178735 | A1 | 6/2015 | Liu |

(Continued)

FOREIGN PATENT DOCUMENTS

| | | | |
|---|---|---|---|
| CN | 108960304 A | 12/2018 | |
| FR | 3062504 A1 | 8/2018 | |
| WO | WO-2021158337 A2 * | 8/2021 | ........... G06F 18/214 |

OTHER PUBLICATIONS

Mubalaike et al. Deep Learning Approach for Intelligent Financial Fraud Detection System. 2018 3rd International Conference on Computer Science and Engineering (UBMK) (pp. 598-603). Publication date: Sep. 1, 2018. (Year: 2018).*

(Continued)

*Primary Examiner* — Patricia H Munson
*Assistant Examiner* — Nancy N Prasad
(74) *Attorney, Agent, or Firm* — Caleb D. Wilkes

(57) ABSTRACT

Application of multi-task learning technique(s) to machine logic (for example, software) used to detect financial transactions that are fraudulent or at least considered likely to be fraudulent. Some embodiments include adjustments and/or additions to conventional multi-task learning techniques in order to make the multi-task learning techniques more suitable for use in fraud detection software. One example of this is compensation for class imbalances that are to be expected as between the likely-fraud and not-likely-fraud classes of data sets (for example, training data sets, runtime data sets).

20 Claims, 3 Drawing Sheets

(56) References Cited

U.S. PATENT DOCUMENTS

| | | | |
|---|---|---|---|
| 2015/0254555 A1* | 9/2015 | Williams, Jr. | G06N 3/045 706/14 |
| 2019/0354805 A1* | 11/2019 | Hind | G06N 3/08 |
| 2020/0210849 A1* | 7/2020 | Ben Kimon | G06Q 20/4016 |

OTHER PUBLICATIONS

Intel, "Research and Applications of Anti-Financial Fraud Models Based on Sandwich-Structured Deep Learning Framework", Case Study, 2018, 6 pages.

"Deep Learning and Cognitive Analysis Based Enhanced Cheque Validation and Fraud Detection", An IP.com Prior Art Database Technical Disclosure, Authors et. al.: Disclosed Anonymously, IP.com No. IPCOM000259429D, IP.com Electronic Publication Date: Aug. 12, 2019, 6 pages.

"Method to Detect Fraudulent Activities on Local Banks Based on People Behavior", An IP.com Prior Art Database Technical Disclosure, Authors et. al.: Disclosed Anonymously, IP.com No. IPCOM000256902D, IP.com Electronic Publication Date: Jan. 8, 2019, 8 pages.

"User Centric Determination of High Risk Transactions in Real Time", An IP.com Prior Art Database Technical Disclosure, Authors et. al.: Disclosed Anonymously, IP.com No. IPCOM000257691D, IP.com Electronic Publication Date: Mar. 2, 2019, 5 pages.

Abakarim et al., "An Efficient Real Time Model for Credit Card Fraud Detection Based on Deep Learning", SITA'18, Rabat, Morocco, 2018, 8 pages.

Bhattacharyya et al., "Data mining for credit card fraud: A comparative study", Decision Support Systems 50 (2011): 602-613, ScienceDirect, Available online Aug. 18, 2010, 12 pages.

Carcillo et al. "SCARFF: a Scalable Framework for Streaming Credit Card Fraud Detection with Spark." Preprint submitted to Information Fusion, Sep. 27, 2017, 33 pages, arXiv:1709.08920v1 [cs.DC] Sep. 26, 2017.

Le et al., "Supervised autoencoders: Improving generalization performance with unsupervised regularizers." Advances in Neural Information Processing Systems. 2018, 32nd Conference on Neural Information Processing Systems (NeurIPS 2018), Montreal, Canada, 11 pages.

Sorournejad et al. "A Survey of Credit Card Fraud Detection Techniques: Data and Technique Oriented Perspective", 2017, 26 pages.

Yang et al., "Fraud Memory: Explainable Memory-Enhanced Sequential Neural Networks for Financial Fraud Detection." Proceedings of the 52nd Hawaii International Conference on System Sciences, 2019, 10 pages.

* cited by examiner

400

FRAUD ALERT
YOUR TRANSACTION (NUMBER 12345678) HAS BEEN PUT ON HOLD BECAUSE THE DEEP LEARNING AND MULTI-TASK LEARNING ALGORITHMS BOTH INDICATE LIKELY FRAUD. YOU WILL BE GETTING A PHONE CALL FROM ONE OF OUR INVESTIGATORS IN THE NEXT 48 HOURS SO THAT WE CAN DETERMINE WHETHER TO LIFT THE HOLD AND ALLOW TRANSACTION #12345678 TO GO FORWARD.

FRAUD DETECTION USING MULTI-TASK LEARNING AND/OR DEEP LEARNING

BACKGROUND

The present invention relates generally to the fields of deep learning and machine logic used to detect fraudulent financial transactions (or, probably-fraudulent transactions, or possibly-fraudulent transactions—typically the "detection" of fraud does not have a one hundred percent accuracy rate, but rather flags certain series of transactions for further investigation and/or clears transactions as being deemed unlikely to be part of a fraud).

The finance industry oversees billions of transactions between consumers and merchants and fraud is increasingly becoming a daunting problem. Several major corporations use computer implemented fraud detection algorithms to assist with the objective of detecting fraudulent financial transactions. Typically these algorithms are rule based approaches which are painstakingly engineered by observing the frauds. These approaches are vulnerable because a fraudulent actor may become aware of the fraud detection rules, and then structure her fraudulent activities to avoid detection by machine logic-based rules. Industry has also started using machine learning (ML) based approaches for prediction which typically require extensive feature engineering.

The Wikipedia entry for "deep learning" (as of 1 May 2020) states, in part, as follows: "Deep learning (also known as deep structured learning) is part of a broader family of machine learning methods based on artificial neural networks with representation learning. Learning can be supervised, semi-supervised or unsupervised. Deep learning architectures such as deep neural networks, deep belief networks, recurrent neural networks and convolutional neural networks have been applied to fields . . . Artificial neural networks (ANNs) were inspired by information processing and distributed communication nodes in biological systems. ANNs have various differences from biological brains. Specifically, neural networks tend to be static and symbolic, while the biological brain of most living organisms is dynamic (plastic) and analog. . . . Deep learning is a class of machine learning algorithms that . . . uses multiple layers to progressively extract higher level features from the raw input. For example, in image processing, lower layers may identify edges, while higher layers may identify the concepts relevant to a human such as digits or letters or faces. . . . Most modern deep learning models are based on artificial neural networks, specifically, Convolutional Neural Networks (CNN)s, although they can also include propositional formulas or latent variables organized layer-wise in deep generative models such as the nodes in deep belief networks and deep Boltzmann machines. In deep learning, each level learns to transform its input data into a slightly more abstract and composite representation. . . . Importantly, a deep learning process can learn which features to optimally place in which level on its own. (Of course, this does not completely eliminate the need for hand-tuning; for example, varying numbers of layers and layer sizes can provide different degrees of abstraction.) The word 'deep' in 'deep learning' refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs is that of the network and is the number of hidden layers plus one (as the output layer is also parameterized). For recurrent neural networks, in which a signal may propagate through a layer more than once, the CAP depth is potentially unlimited. No universally agreed upon threshold of depth divides shallow learning from deep learning, but most researchers agree that deep learning involves CAP depth higher than 2. CAP of depth 2 has been shown to be a universal approximator in the sense that it can emulate any function. Beyond that, more layers do not add to the function approximator ability of the network. Deep models (CAP>2) are able to extract better features than shallow models and hence, extra layers help in learning the features effectively." (footnotes omitted)

The Wikipedia entry for "multi-task learning" (as of 6 May 2020) states, in part, as follows: "Multi-task learning (MTL) is a subfield of machine learning in which multiple learning tasks are solved at the same time, while exploiting commonalities and differences across tasks. This can result in improved learning efficiency and prediction accuracy for the task-specific models, when compared to training the models separately. Early versions of MTL were called 'hints.' In a widely cited 1997 paper, Rich Caruana gave the following characterization: 'Multitask Learning is an approach to inductive transfer that improves generalization by using the domain information contained in the training signals of related tasks as an inductive bias. It does this by learning tasks in parallel while using a shared representation; what is learned for each task can help other tasks be learned better.' In the classification context, MTL aims to improve the performance of multiple classification tasks by learning them jointly. One example is a spam-filter, which can be treated as distinct but related classification tasks across different users. To make this more concrete, consider that different people have different distributions of features which distinguish spam emails from legitimate ones, for example an English speaker may find that all emails in Russian are spam, not so for Russian speakers. Yet there is a definite commonality in this classification task across users, for example one common feature might be text related to money transfer. Solving each user's spam classification problem jointly via MTL can let the solutions inform each other and improve performance. Further examples of settings for MTL include multiclass classification and multi-label classification. Multi-task learning works because regularization induced by requiring an algorithm to perform well on a related task can be superior to regularization that prevents overfitting by penalizing all complexity uniformly. One situation where MTL may be particularly helpful is if the tasks share significant commonalities and are generally slightly under sampled. However, as discussed below, MTL has also been shown to be beneficial for learning unrelated tasks." (footnotes omitted)

It is further noted that multi-task learning is understood by those of skill in the art to be a higher level concept where the structure underneath the multi-task learning implementation code is some variety of a machine learning structure (that is, some variety of a machine learning algorithm). As used herein, the term "multi-task learning algorithm" will be used to collectively refer to both of the underlying learning structure and the multi-task instructions.

SUMMARY

According to an aspect of the present invention, there is a method, computer program product and/or system that performs the following operations (not necessarily in the following order): (i) training a multi-task learning algorithm including an underlying learning structure and multi-task instructions, the multi-task learning algorithm being programmed and/or structured to receive new data sets representing financial transactions and to selectively provide likely-fraud determinations and likely-not-fraud determinations; (ii) receiving, by the multi-task learning algorithm, a first new data set representing a first financial transaction; and (iii) applying the multi-task learning algorithm to data of the first new data set to determine that the first financial transaction is likely-fraud. The multi-task learning instructions: (a) solve multiple learning tasks in a temporally overlapping manner while exploiting commonalities and differences across tasks resulting in improved learning efficiency and prediction accuracy for the task-specific models, when compared to training multiple models separately, and (b) improve generalization by using the domain information contained in the training signals of related tasks as an inductive bias by learning tasks in parallel while using a shared representation so that what is learned for each task can help other tasks be learned.

DETAILED DESCRIPTION

Figure 1:
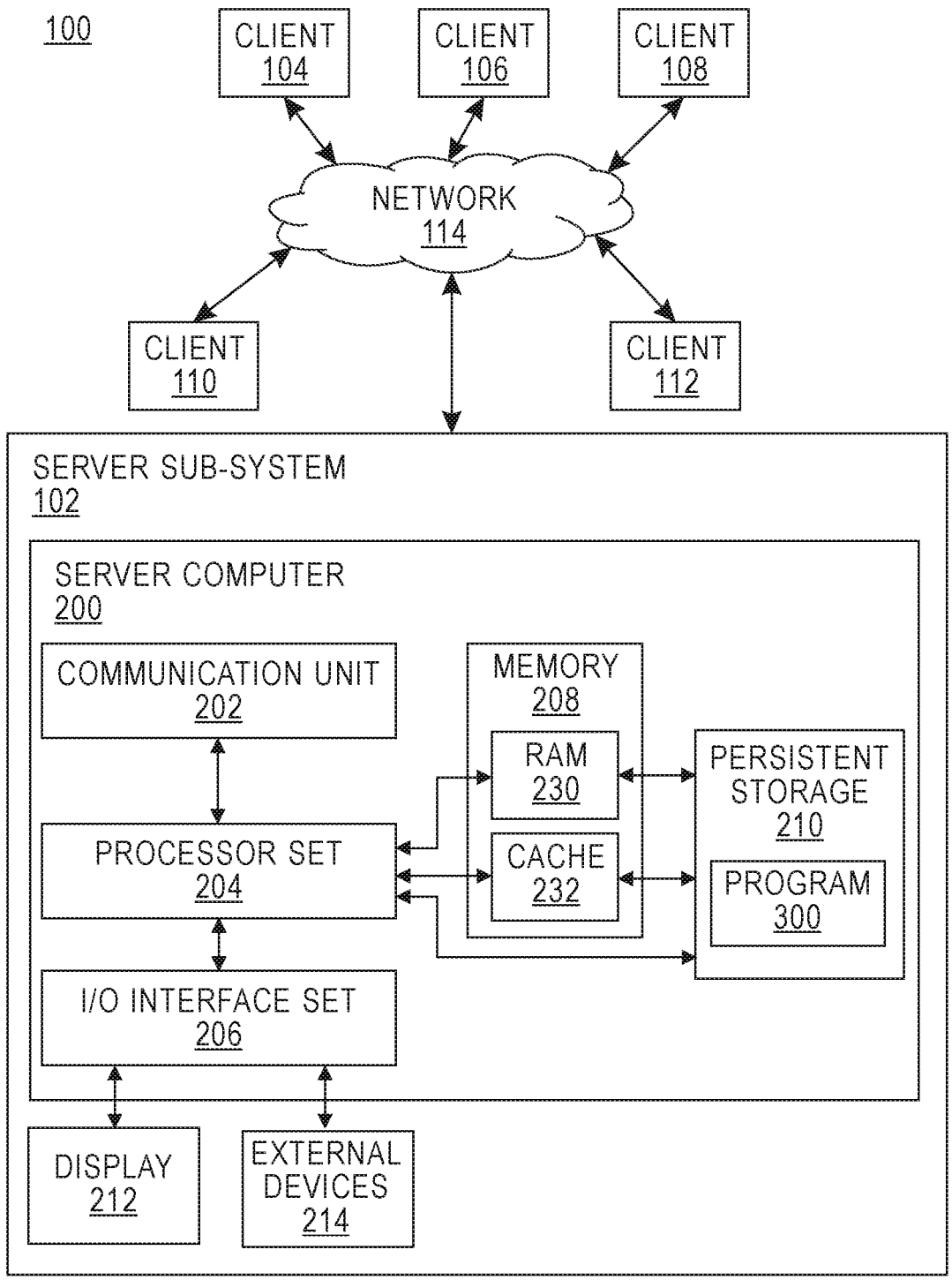
FIG. 1 is a block diagram of a first embodiment of a system according to the present invention.

Some embodiments of the present invention are directed to the application of multi-task learning technique(s) to machine logic (for example, software) used to detect financial transactions that are fraudulent or at least considered likely to be fraudulent. Some embodiments include adjustments and/or additions to conventional multi-task learning techniques in order to make the multi-task learning techniques more suitable for use in fraud detection software. One example of this is compensation for class imbalances that are to be expected as between the likely-fraud and not-likely-fraud classes of data sets (for example, training data sets, runtime data sets). This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
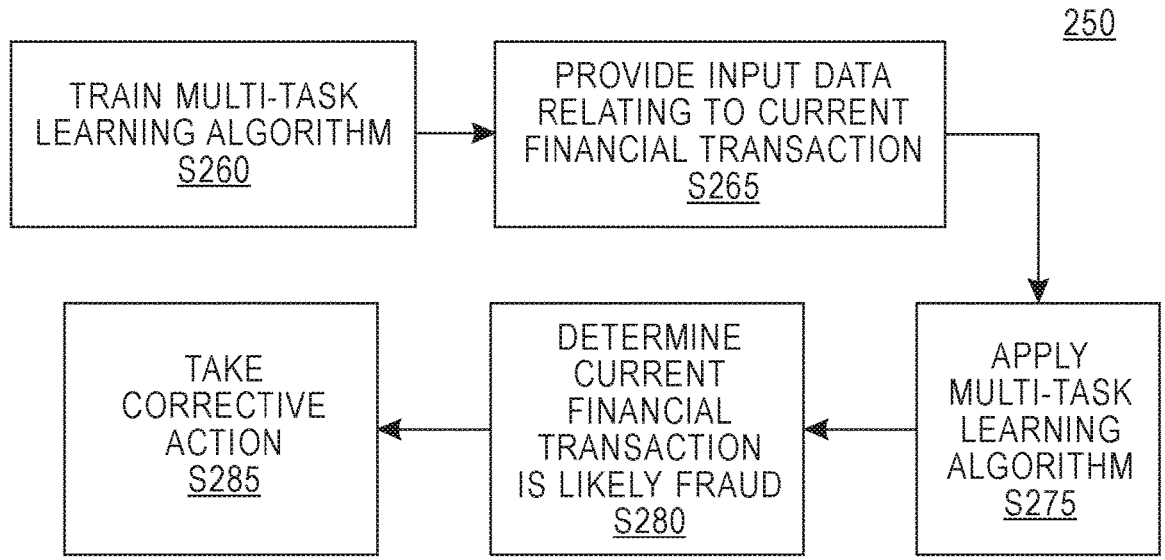
FIG. 2 is a flowchart showing a first embodiment method performed, at least in part, by the first embodiment system.
Figure 3:
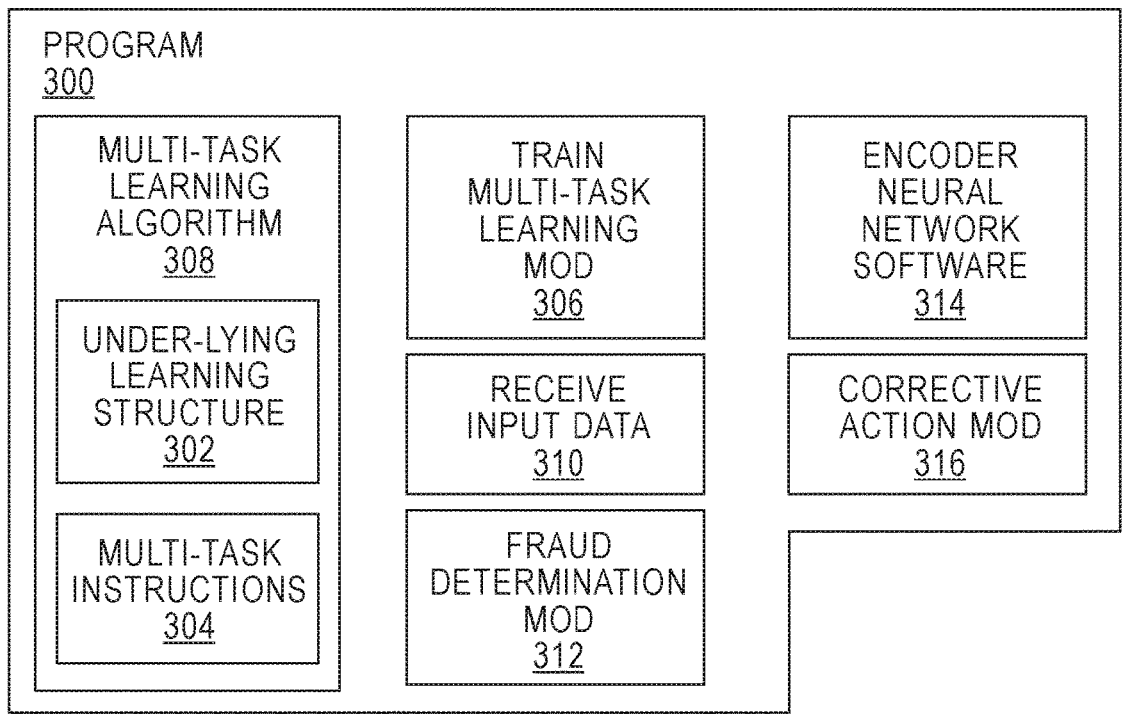
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S260, where train multi-task learning module ("mod") 306 trains a multi-task learning algorithm 308 using historical data received from client sub-system 104 through communication network 114 (see FIG. 1). In this example, the training takes the form of both supervised and unsupervised learning. The historical data used for training is data related to previous real world financial transactions, some of which involved fraud and some of which did not involve fraud. In this way multi-task learning algorithm 308 is trained to detect likely, or potential, fraud. This multi-task learning algorithm meets the definition of multi-task learning algorithms set forth, above, in the Background section.

As shown in FIG. 3, multi-task learning algorithm 308 includes: underlying learning structure 302; and multi-task instructions 304. Underlying learning structure 302 is, in this example embodiment, a deep learning style learning structure that performs deep learning (see the definition of "deep learning," above, in the Background section). Alternatively, other types of machine learning structures (now known or to be developed in the future) may be used as the underlying learning structure. The multi-task instructions cause the underlying learning structure to be accessed (for example, trained, re-trained and/or used to do fraud detection procedures on new financial transactions) in a multi-task manner. The multi-tasking aspects of the present invention are discussed in more detail, below, in the next sub-section of this Detailed Description.

Processing proceeds to operation S265, where receive input data mod 310 receives data relating to a new financial transaction involving a bank (represented by client sub-system 106), a customer (represented by client sub-system 108) and a credit card company (represented by client sub-system 110). Program 300 will determine whether the current financial transaction raises concerns about potential fraud by the customer.

Processing proceeds to operation S275, where fraud determination mod 312 applies underlying learning structure 302, running on encoder neural network software 314, to the input data characterizing the current financial transaction to determine whether fraud is likely. In this example, fraud likelihood quotient is determined to be 9.9 out of 10.0. Encoder neural network software 314, in this embodiment, is an encoder-decoder (although, as is the practice of the art, on encoder-decoder may be referred to more simply as an "encoder"). The sub-system that includes multitask learning algorithm and encoder neural network upon which the multitask is performed are herein referred to as an "ensemble classifier component," or, more simply, as an "ensemble classifier."

Processing proceeds to operation S280, where fraud determination module determines that fraud is sufficiently likely such that further investigation should take place. More specifically, in this example, if the fraud likelihood quotient, of 9.9, is greater than a threshold value of 9.0, meaning that corrective action should be taken. Processing proceeds to operation S285 where take corrective action mod 316 takes corrective action in response to the likely fraud (as shown by the fraud alert text message screen shot 400 of FIG. 4). In this example, the types of possible corrective actions are as follows: (i) decline the transaction so the purchase is not completed; (ii) annotate this account as having suspicious activity so as to increase the likelihood that a future transaction is labeled as fraud; (iii) invalidate this card number so it cannot be used in future transactions; (iv) increment the number of suspicious purchases at this merchant so that future purchases at the merchant will be more likely to be labelled fraud; and (v) use this example to improve training and accuracy of fraud detection models. In some embodiments, a text message is corrective action in the form of two-factor authentication, where a separate, non-compromised form of communication is used to check the integrity of another (the card transaction).

In the embodiment of FIGS. 2 and 3, a multitask learning algorithm, including an underlying learning structure (for example, a deep learning structure) and multi-task instructions, is applied to the field of fraud detection (for example, fraud detection in financial transactions involving transacting entities and money). The model of the example of FIGS. 2 and 3 use a single learning structure (that is underlying learning structure 302, which, in this example, happens to be a deep learning structure). Alternatively, underlying learning structures other than deep learning type learning structures may be used as the underlying learning structure (which is nevertheless controlled in a multitask manner).

As a further alternative, some embodiments of the present invention may use an "ensemble model" meaning that more than one learning structure is used (for example, a deep learning structure and a non-deep-learning type learning structure. In an ensemble model embodiment, the model of the multiple learning structures are combined to obtain predictions better than any of the individual models yields individually. One, some or all of the underlying learning structures in an ensemble model embodiment may be controlled in a multitask manner. In some ensemble model embodiments, a new financial transaction is determined to be likely-fraud only if all of the multiple underlying learning structures declare fraud. In other ensemble model embodiments, a new financial transaction is determined to be likely-fraud if a weighted combination of the results obtained from the multiple underlying learning structures so indicates. Other functions can be used to combine the output of multiple underlying learning structures in ensemble model embodiments of the present invention (for example, likely-fraud is considered to be determined only if a majority of the multiple underlying learning structures so indicate).

One feature that may be used to help apply multi-task learning algorithms specifically to the field of fraud detection is imbalance compensation instructions to compensate for the fact that fraud-likely and fraud-not-likely classes of data sets are typically highly imbalanced, with a great prevalence of fraud-not-likely data sets.

III. Further Comments and/or Embodiments

Some embodiments of the present invention recognize one, or more, of the following facts, potential problems and/or potential areas for improvement with respect to the current state of the art: (i) from a scientific point of view, the impact of multi-task based regularization is studied in highly imbalanced fraud detection problems; and/or (ii) from a business point of view, a good fraud detection approach translates directly into saving millions of dollars that would otherwise be lost to fraud.

Some embodiments of the present invention may include one, or more, of the following operations, features, characteristics and/or advantages: (i) a multi-task learning based deep learning approach for credit fraud detection; (ii) detects fraudulent transactions using machine logic (for example, software); (iii) a method that uses an imbalance sensitive loss function along with an auxiliary task component to learn an effective model for fraud detection; and/or (iv) the model, through its objective is able to handle differences in the minority class from diverse to specific patterns, which is potentially useful when it is not known how to balance focus on the minority class versus the majority class; and/or (v) an effective ensemble with tree based models.

Some embodiments of the present invention use a model that is robust to diverse fraud scenarios, thereby providing an effective solution. Fraud patterns can vary in different circumstances. A model which can conveniently fit the given circumstance is highly valuable. In some embodiments, inference time on CPU (central processing unit) is similar to popular ensemble models used in industry. Relative simplicity of the model allows for fast inference satisfying real life timing requirements. Some embodiments avoid feature engineering by using a deep learning approach. Some embodiments obtain results that demonstrate a significant reduction in false positives while keeping false negatives nearly unaffected. Considerable value is thereby added by reducing consumer discomfort. Some embodiments can work with other fraud filters to effectively allow for better decision making and deciding the urgency level given the situation.

Some embodiments of the present invention may include one, or more, of the following operations, features, characteristics and/or advantages: (i) a robust solution focusing on the problem with the of fraud detection that: (a) entails relatively few false negatives (missed frauds), (b) relatively few false positives will which can lead to (annoyed customers incorrectly flagged for further fraud investigation), and (c) is adaptive to changing situations; (ii) unlike images or text, transaction related data has heterogenous features that are a mixture of features that are a mixture of continuous (for example, $0-$10,000) and categorical attributes (for example, 1=Bob, 2=Jane, 3=Sally, etc. maps names to numbers); (iii) these categorical features are represented using embedding because the categorical numbering is arbitrary and confusing for models; (iv) uses multi-task regularization in the setting of extreme class imbalance (a very small fraction of credit card transactions are fraudulent) to add robustness, i.e. not learn erroneous facts (e.g. that all transactions made at 3 minutes past the hour are fraudulent even though that may have been the case in the training data)—and further noting per Wikipedia that (a) in multi-task learning, multiple learning tasks are solved at the same time, while exploiting commonalities and differences across tasks; and (b) regularization is the process of adding information in order to solve an ill-posed problem or to prevent overfitting; (v) allows for several meaningful alternatives for the auxiliary task (for example, reconstruction from the fraud model of the transaction details and prediction of user ID of the person making a purchase); (vi) employs an instance-sensitive loss also known as "error") function which, as part of multi-task loss function, allows the model to handle different distributions of frauds, which is diverse across more specific patterns of fraud); (vii) uses a model that is modular in nature, thereby allowing for other deep learning classifiers to be easily used in the model with similar benefits; and/or (viii) uses an ensemble model that combines multiple individual (fraud detection) models to create a better prediction than any of the individual models (for example, using weighted averaging to combine predictions from a tree based model and a deep learning models).

Further with respect to item (iii) in the previous paragraph, embedding helps counter the arbitrariness and confusion of assigning an ordered series (for example, integer numbers) to a set of objects (for example, people) that has no inherent ordering. For example, 2=Jane is not really closer to 1=Bob than 3=Sally. An embedding makes numbers comparable. For example the embedding known as one-hot encoding creates a binary feature for each name: 1 if the name is present and 0 otherwise, so a numeric syntax might have 1-0-0=Bob, 0-1-0=Jane, and 0-0-1=Sally.

Figures 4, 5:
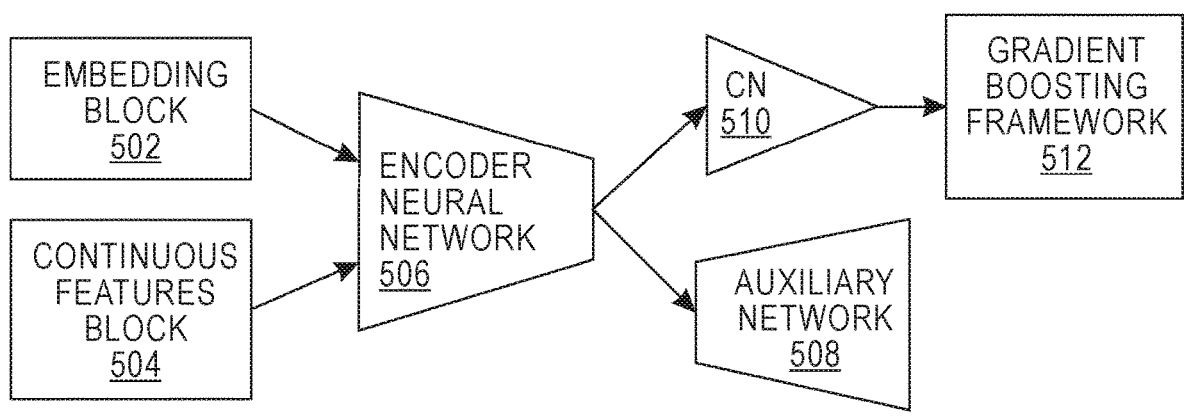
FIG. 4 is a screenshot view generated by the first embodiment system.
FIG. 5 is a block diagram of a second embodiment of a system according to the present invention.

More specifically in FIG. 5, diagram 500 includes: embedding block 502 (this block generates an embedding of each categorical feature in the transaction, such as but not limited to merchant name, zip code, etc., as a vector representation, typically in low-dimension, to efficiently capture and encode the feature relationships in the transaction data); continuous features block 504 (this block generates a scaled and/or normalized feature for the continuous values, such as but not limited to the amount and time of transaction); encoder neural network 506 (this block generates a distilled representation in latent space capturing the complex interactions of the categorical and continuous features in the original transaction data=the encoder neural network block 506 is not limited to feed-forward networks and could be sequential); auxiliary network 508 (this block takes the intermediate encoded representation to perform an auxiliary task, which in one embodiment is to reconstruct (generate) some input feature, such as but not limited to the user id or age, in the transaction using the same latent features as the classifier); classification network block 510 (this block takes in the encoder's representation to classify (predict) the transaction as fraudulent (or not fraudulent)); and gradient boosting framework 512. Gradient boosting framework 512 is combined with the classification network 510 to obtain the prediction(s) as fraudulent (or non-fraudulent) transactions. Auxiliary network 508 is used only during the training phase and not during the inference phase.

Embedding block 502 and continuous features block 504 represent two (2) types of input data received pursuant to a credit card transaction. Encoder neural network block 506 converts the inputs to an internal representation more amenable to analysis performed at blocks downstream of block 506. Auxiliary network 508 performs auxiliary tasks like predicting the identity of the card holder based on other information in the transaction. This is a capability which can be used to further improve fraud detection. Classification network block 510 classifies fraud/non-fraud. In various embodiments of the present invention, classification network block 510 take many forms such as, neural network-based approach, a gradient boosted approach, logistic regression, any other classification algorithm and/or various combinations of the foregoing enumerate types.

An objective function is a mathematical statement that reflects the value of a quantity to be optimized. For example, if one wants to see how high a ball will be launched in the air under the influence of a given force, the objective function might give height for a given angle at which the ball is thrown. The objective function for an embodiment of a deep learning model, applicable to various embodiments of the present invention, is given by Expression (1):

$$-\alpha(1-p\_t)^\gamma \log(p\_t)+|x\_input-x\_decoder| \quad (1)$$

Where: (i) x_input: Input generated from embedding block 502 in FIG. 5; (ii) x_decoder: Decoded output from a decoder, as one embodiment of the auxiliary network 508 in FIG. 5; (iii) p_t: Predicted class probability (i.e. model's assessment of the probability that the transaction is in the fraudulent or non-fraudulent class of transactions), as the output of classification network block 510 in FIG. 5; (iv) $\gamma$: Exponent for weighting the loss term to focus on the hard-to-classify cases (fraudulent transactions); and (v) $\alpha$: Class weight assigned to fraudulent (and non-fraudulent) examples to offset the imbalance in the dataset. The objective (or loss or error) function in Expression (1) includes two components, (a) the error from the classifier network (510) and (b) the error from the auxiliary network (508). Different error functions could be employed for (a) and (b), for example, classifier network block 510 could use "focal loss," which gives less weight to values in the common case (no fraud), and auxiliary network 508 could use another error function, for example mean square error. Given the datasets for fraud-detection are highly imbalanced, often with less than 0.1% of all the transactions being labelled as fraudulent, the total loss contribution from easy-to-classify (non-fraudulent) examples significantly outweigh the hard-to-classify examples. Hence, the first term in the objective function is introduced with $\gamma$, usually set to >0, to force focus on the hard-to-classify fraudulent cases. The focal loss approach has been used in other domains, such as object detection, and it is a preferred embodiment for this invention for handling highly imbalanced data of the sort seen with fraud-detection model training. The second term, in one embodiment, is the reconstruction loss from the auxiliary task (network), which captures the loss in the network's ability to reconstruct some input feature faithfully, thereby forcing the end-to-end network to learn rich latent features that helps to improve the classifier performance (accuracy, reduced false-positives and false-negatives). A different auxiliary task can be used by changing the second term of the objective appropriately.

A method of utilizing identifying a likelihood of credit card fraud, according to an embodiment of the present invention, includes the following operations (not necessarily in the following order): (i) receiving by a computing device a credit card transaction for a likelihood of credit card fraud assessment, the credit card transaction attempted by a consumer; (ii) receiving by the computing device consumer-specific credit risk information, the user-specific credit risk information specific to the consumer; (iii) receiving by the computing device global credit risk information; (iv) encoding by the computing device a neural network based upon the consumer-specific credit risk information and the global credit risk information; and (v) utilizing by the computing device the neural network to assess the likelihood of credit card fraud for the credit card transaction. In this embodiment of a method, encoding of the neural network includes computation of an error function to address class imbalance.

More specifically, in one example of imbalance compensation instructions according to an embodiment of the present invention, there are two classes: fraudulent transactions and non-fraudulent transactions. These two classes are imbalanced, relative to each other, due to the fact that non-fraudulent transactions heavily outnumber fraudulent (roughly 1000:1 in this example). In computing the error during training of the model, the contribution to the error value will be dominated by the mispredicted non-fraudulent transactions (that is, false positive assessments of fraud). Therefore, some embodiments of the present invention use focal loss as the error function because use of focal loss helps to offset this imbalance by giving higher weight to mispredicted fraudulent transactions.

Some embodiments of the present invention may include one, or more, of the following operations, features, characteristics and/or advantages: (i) receiving transaction information by user along with user/card specific details with labels for fraud/non fraud; (ii) all the user records are utilized together with their labels as training data to provide global picture; (iii) in utilization through a multi-task framework where one task predicts fraud likelihood whereas the other auxiliary task focuses on user specific traits; (iv) performs multi-task learning with focus solely on the task of honoring/dishonoring the check; (v) solves a class imbalance problem, where a credit card fraud's extreme imbalance (1/500 to 1/1000) may be present in the machine learning workloads; (vi) focuses on credit cards (feature A) and online transactions using a pattern of purchases for credit cards; (vii) uses a supervised approach and has an end-to-end training pipeline utilizing Multi-task Learning, which enables better discrimination of fraud in a broad range of conditions; (viii) use of multi-task learning in our filing enables better discrimination of fraud in a broad range of conditions; (ix) uses an approach that is deep learning based and multi-task based; (x) uses a fully automated approach; (xi) uses the input transaction information from all users with the aid of a multi-task approach where an auxiliary task apart from fraud detection is focused on user specific factors (for example, the auxiliary task may be performed by an autoencoder that simply tries to reproduce some features of the input); (xii) uses neural networks on a dataset constituted by all the information from transactions of all users (herein sometimes referred to as global information); and/or (xiii) uses multi-task learning with an auxiliary task to capture user specific traits for example, predicting the identity of the user or the age of the user.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/ or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:

training a machine learning structure to perform multiple tasks, wherein a first task of the multiple tasks is to classify new data sets representing financial transactions as likely fraudulent or likely not fraudulent and is performed via a classification network that comprises a tree based model and a deep learning network, wherein a second task of the multiple tasks is performed via an auxiliary network, wherein the classification network and the auxiliary network receive a shared representation from an encoder portion of the machine learning structure, wherein the training comprises inputting training data sets into the machine learning structure, the training data sets being distributed across likely fraudulent and likely not fraudulent data sets and comprising categorical features and continuous features, wherein the machine learning structure further comprises:

an embedding block that generates first embeddings of the categorical features and a continuous features block that processes the continuous features, wherein the first embeddings and output from the continuous features block are input into the encoder portion, wherein the training further comprises applying an objective function comprising:

$$-\alpha(1-p\_t)^\gamma \log(p\_t) + |x\_input - x\_decoder|$$

where: (i) x_input is an input value generated from the embedding block, (ii) x_decoder is decoded output from the auxiliary network, (iii) p_t is predicted class probability that reflects an assessment, by the classification network, of the probability that a transaction represented in a respective one of the training data sets is in a likely fraudulent or likely non fraudulent class of transactions, (iv) $\gamma$ is an exponent set to >0 and forces the objective function to focus on the likely fraudulent data sets, and (v) $\alpha$ is class weight assigned to offset imbalance in the distribution between the likely fraudulent and the likely not fraudulent data sets of the training data sets, wherein the applying of the objective function includes minimizing error from the first task and from the second task, wherein a first error function comprising a focal loss is applied for the first task, and a second error function that is different from the first error function is applied for the second task;

performing a first inference via inputting into the trained machine learning structure a first new data set representing a first financial transaction, wherein, in response to the inputting, the trained machine learning structure determines that the first financial transaction is likely fraudulent, wherein the determination is based on the trained machine learning structure performing operations comprising:

obtaining a tree-based prediction with the tree-based model, obtaining a deep learning prediction with the deep learning model, combining at least the tree-based prediction and the deep learning prediction by taking a weighted average of the tree-based prediction and the deep learning prediction; and comparing the weighted average as a fraud likelihood score to a predetermined threshold value, wherein the auxiliary network is not used for the first inference and for a second inference;

in response to the fraud likelihood score of the first financial transaction exceeding the predetermined threshold value:

presenting, via a processor, a notification that the first financial transaction is likely fraudulent, declining, via the processor, the first financial transaction, and invalidating, via the processor, a card number associated with the first financial transaction so the card number cannot be used in future transactions;

performing the second inference via inputting into the trained machine learning structure a second new data set representing a second financial transaction, wherein, in response to the inputting, the trained machine learning structure determines that the second financial transaction is likely fraudulent; and in response to the trained machine learning structure determining that the second financial transaction is likely fraudulent:

transmitting a message in a form of a two-factor authentication; and retraining the classification network based on the second financial transaction.

2. The CIM of claim 1, wherein the first new data set includes categorical features and continuous features.

3. The CIM of claim 1, wherein the first new data set includes:

a first input parameter value corresponding to a first input parameter, with the first input parameter being a continuous type of parameter; and a second input parameter value corresponding to a second input parameter, with the second input parameter being a categorical type of parameter.

4. The CIM of claim 1, wherein the machine learning structure comprises an encoder-decoder neural network that encompasses the encoder portion.

5. The CIM of claim 1, wherein the machine learning structure further comprises a gradient boosting framework that works with the classification network to perform the classifying of the data sets as likely fraudulent or likely not fraudulent.

6. The CIM of claim 1, wherein the training comprises supervised learning and unsupervised learning.

7. A computer program product (CPP) comprising:

a set of one or more storage devices; and computer code stored collectively in the set of one or more storage devices, with the computer code including instructions to cause a processor set to perform operations comprising:

training a machine learning structure to perform multiple tasks, wherein a first task of the multiple tasks is to classify new data sets representing financial transactions as likely fraudulent or likely not fraudulent and is performed via a classification network that comprises a tree based model and a deep learning network, wherein a second task of the multiple tasks is performed via an auxiliary network, wherein the classification network and the auxiliary network receive a shared representation from an encoder portion of the machine learning structure, wherein the training comprises inputting training data sets into the machine learning structure, the training data sets being distributed across likely fraudulent and likely not fraudulent data sets and comprising categorical features and continuous features, wherein the machine learning structure further comprises:

an embedding block that generates first embeddings of the categorical features and a continuous features block that processes the continuous features, wherein the first embeddings and output from the continuous features block are input into the encoder portion, wherein the training further comprises applying an objective function comprising:

$$-\alpha(1-p\_t)^\gamma \log(p\_t)+|x\_input-x\_decoder|$$

where: (i) x_input is an input value generated from the embedding block, (ii) x_decoder is decoded output from the auxiliary network, (iii) p_t is predicted class probability that reflects an assessment, by the classification network, of the probability that a transaction represented in a respective one of the training data sets is in a likely fraudulent or likely non fraudulent class of transactions, (iv) $\gamma$ is an exponent set to >0 and forces the objective function to focus on the likely fraudulent data sets, and (v) $\alpha$ is class weight assigned to offset imbalance in the distribution between the likely fraudulent and the likely not fraudulent data sets of the training data sets, wherein the applying of the objective function for the training includes minimizing error from the first task and from the second task, wherein a first error function comprising a focal loss is applied for the first task, and a second error function that is different from the first error function is applied for the second task;

performing a first inference via inputting into the trained machine learning structure a first new data set representing a first financial transaction, wherein, in response to the inputting, the trained machine learning structure determines that the first financial transaction is likely fraudulent, wherein the determination is based on the trained machine learning structure performing steps comprising:

obtaining a tree-based prediction with the tree-based model, obtaining a deep learning prediction with the deep learning model, combining at least the tree-based prediction and the deep learning prediction by taking a weighted average of the tree-based prediction and the deep learning prediction; and comparing the weighted average as a fraud likelihood score to a predetermined threshold value, wherein the auxiliary network is not used for the first inference and for a second inference;

in response to the fraud likelihood score of the first financial transaction exceeding the predetermined threshold value:

presenting a notification that the first financial transaction is likely fraudulent, declining the first financial transaction, and invalidating a card number associated with the first financial transaction so the card number cannot be used in future transactions;

performing the second inference via inputting into the trained machine learning structure a second new data set representing a second financial transaction, wherein, in response to the inputting, the trained machine learning structure determines that the second financial transaction is likely fraudulent; and in response to the trained machine learning structure determining that the second financial transaction is likely fraudulent:

transmitting a message in a form of a two-factor authentication; and
retraining the classification network based on the second financial transaction.

8. The CPP of claim 7, wherein the first new data set includes categorical features and continuous features.

9. The CPP of claim 7, wherein the first new data set includes:
a first input parameter value corresponding to a first input parameter, with the first input parameter being a continuous type of parameter; and
a second input parameter value corresponding to a second input parameter, with the second input parameter being a categorical type of parameter.

10. The CPP of claim 7, wherein the machine learning structure comprises an encoder-decoder neural network that encompasses the encoder portion.

11. The CPP of claim 7, wherein the machine learning structure further comprises a gradient boosting framework that works with the classification network to perform the classifying of the data sets as likely fraudulent or likely not fraudulent.

12. The CPP of claim 7, wherein the training comprises supervised learning and unsupervised learning.

13. The CPP of claim 7, wherein the operations further comprise transmitting a two-factor authentication message in further response to the fraud likelihood score of the first financial transaction exceeding the predetermined threshold value.

14. A computer system (CS) comprising:
a processor set;
a set of one or more storage devices; and
computer code stored collectively in the set of one or more storage devices, with the computer code including instructions to cause the processor set to perform operations comprising:
training a machine learning structure to perform multiple tasks, wherein a first task of the multiple tasks is to classify new data sets representing financial transactions as likely fraudulent or likely not fraudulent and is performed via a classification network that comprises a tree based model and a deep learning network, wherein a second task of the multiple tasks is performed via an auxiliary network, wherein the classification network and the auxiliary network receive a shared representation from an encoder portion of the machine learning structure, wherein the training comprises inputting training data sets into the machine learning structure, the training data sets being distributed across likely fraudulent and likely not fraudulent data sets and comprising categorical features and continuous features, wherein the machine learning structure further comprises:
an embedding block that generates first embeddings of the categorical features and
a continuous features block that processes the continuous features, wherein the first embeddings and output from the continuous features block are input into the encoder portion, wherein the training further comprises applying an objective function comprising:

$$-\alpha(1-p\_t)^\gamma \log(p\_t)+|x\_input-x\_decoder|$$

where: (i) x_input is an input value generated from the embedding block, (ii) x_decoder is decoded output from the auxiliary network, (iii) p_t is predicted class probability that reflects an assessment, by the classification network, of the probability that a transaction represented in a respective one of the training data sets is in a likely fraudulent or likely non fraudulent class of transactions, (iv) γ is an exponent set to >0 and forces the objective function to focus on the likely fraudulent data sets, and (v) α is class weight assigned to offset imbalance in the distribution between the likely fraudulent and the likely not fraudulent data sets of the training data sets, wherein the applying of the objective function includes minimizing error from the first task and from the second task, wherein a first error function comprising a focal loss is applied for the first task, and a second error function that is different from the first error function is applied for the second task;
performing a first inference via inputting into the trained machine learning structure a first new data set representing a first financial transaction, wherein, in response to the inputting, the trained machine learning structure determines that the first financial transaction is likely fraudulent, wherein the determination is based on the trained machine learning structure performing steps comprising:
obtaining a tree-based prediction with the tree-based model,
obtaining a deep learning prediction with the deep learning model,
combining at least the tree-based prediction and the deep learning prediction by taking a weighted average of the tree-based prediction and the deep learning prediction; and
comparing the weighted average as a fraud likelihood score to a predetermined threshold value,
wherein the auxiliary network is not used for the first inference and for a second inference;
in response to the fraud likelihood score of the first financial transaction exceeding the predetermined threshold value:
presenting a notification that the first financial transaction is likely fraudulent,
declining the first financial transaction, and
invalidating a card number associated with the first financial transaction so the card number cannot be used in future transactions;
performing the second inference via inputting into the trained machine learning structure a second new data set representing a second financial transaction, wherein, in response to the inputting, the trained machine learning structure determines that the second financial transaction is likely fraudulent; and
in response to the trained machine learning structure determining that the second financial transaction is likely fraudulent:
transmitting a message in a form of a two-factor authentication; and
retraining the classification network based on the second financial transaction.

15. The CS of claim 14, wherein the first new data set includes categorical features and continuous features.

16. The CS of claim 14, wherein the machine learning structure comprises an encoder-decoder neural network that encompasses the encoder portion.

17. The CS of claim 14, wherein the machine learning structure further comprises a gradient boosting framework that works with the classification network to perform the classifying of the data sets as likely fraudulent or likely not fraudulent.

18. The CIM of claim 1, wherein the second task of the auxiliary network comprises predicting a respective user ID associated with the financial transactions.

19. The CIM of claim 1, wherein the second task of the auxiliary network comprises reconstruction of one or more transaction details associated with the financial transactions.

20. The CPP of claim 7, wherein the second error function for the second task comprises a mean square error function.

* * * * *